(12) United States Patent
Cai et al.

(10) Patent No.: US 12,282,716 B2
(45) Date of Patent: Apr. 22, 2025

(54) SPECTRALLY SELECTIVE EMITTER AND DESIGN METHOD THEREOF

(71) Applicant: SOOCHOW UNIVERSITY, Suzhou (CN)

(72) Inventors: Qilin Cai, Suzhou (CN); Xi Wu, Suzhou (CN); Yingshi Zhang, Suzhou (CN); Qing Ye, Suzhou (CN); Xueliang Fan, Suzhou (CN); Yelin Deng, Suzhou (CN); Weifeng Zhao, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 561 days.

(21) Appl. No.: 17/790,064

(22) PCT Filed: Apr. 20, 2021

(86) PCT No.: PCT/CN2021/088345
§ 371 (c)(1),
(2) Date: Jun. 29, 2022

(87) PCT Pub. No.: WO2022/193399
PCT Pub. Date: Sep. 22, 2022

(65) Prior Publication Data
US 2023/0334194 A1    Oct. 19, 2023

(30) Foreign Application Priority Data
Mar. 19, 2021 (CN) .......................... 202110296109.4

(51) Int. Cl.
*G06F 30/20* (2020.01)
*H10N 10/855* (2023.01)
(Continued)

(52) U.S. Cl.
CPC ............ *G06F 30/20* (2020.01); *H10N 10/855* (2023.02); *G06F 2111/10* (2020.01); *G06F 2119/08* (2020.01)

(58) Field of Classification Search
CPC .. G06F 30/20; G06F 2119/08; G06F 2111/10; H10N 10/855
See application file for complete search history.

(56) References Cited

U.S. PATENT DOCUMENTS

| 6,271,461 B1 | 8/2001 | Fraas et al. | |
| 2020/0191655 A1* | 6/2020 | Carr | ..................... H10N 10/855 |

FOREIGN PATENT DOCUMENTS

| CN | 102540462 A | 7/2012 |
| CN | 108633316 A | 10/2018 |
| CN | 110957289 A | 4/2020 |

OTHER PUBLICATIONS

D. Diso et al., "Erbium containing ceramic emitters for thermophotovoltaic energy conversion" Materials Science and Engineering B98 (2003) 144-149 (Mar. 15, 2003).

* cited by examiner

*Primary Examiner* — Sean M Luck
(74) *Attorney, Agent, or Firm* — SZDC Law PC

(57) ABSTRACT

The present invention relates to a spectrally selective emitter and a design method thereof. The designed emitter has a one-dimensional layered structure, including a first layer, a second layer and a third layer arranged in sequence, wherein both the first and third layers are hafnium oxide layers, and the second layer is a hafnium oxide layer with multiple erbium oxide nanoparticles distributed. The designed emitter is a material-type emitter with spectrally selective emittance. Compared with the traditional structure-type emitter, the material-type emitter has high thermal stability and oxidation resistance, which can fundamentally solve the (Continued)

high-temperature degradation problem. The invention has the characteristics of accuracy and high efficiency, and can comprehensively reveal the variation rule of the spectral emittance of the material-type hafnium oxide selective emitter doped with erbium oxide nanoparticles and the doping amount and nanoparticles size, which can laying a foundation for the practical application of high-temperature selective emitter.

10 Claims, 4 Drawing Sheets

(51) Int. Cl.
*G06F 111/10* (2020.01)
*G06F 119/08* (2020.01)

SPECTRALLY SELECTIVE EMITTER AND DESIGN METHOD THEREOF

This application is the National Stage Application of PCT/CN2021/088345, filed on Apr. 20, 2021, which claims priority to Chinese Patent Application No. 202110296109.4, filed on Mar. 19, 2021, which is incorporated by reference for all purposes as if fully set forth herein.

FIELD OF THE INVENTION

The present invention relates to the technical field of thermal radiation, and particularly to a spectrally selective emitter and a design method thereof.

DESCRIPTION OF THE RELATED ART

Solar thermophotovoltaic (STPV) system is a high-efficiency thermoelectric conversion technology that can directly convert the high-temperature thermal radiation generated by sunlight into electric energy. The STPV system usually includes a concentrator, an absorber, an emitter, and a thermophotovoltaic cell, and the underlying principle is that after hitting the concentrator, the sunlight is concentrated by the concentrator and transmitted to the absorber, the concentrated sunlight is absorbed by the absorber, and the temperature rise, by which the emitter is heated to emit thermal radiation energy, and the thermal radiation energy falling within the bandgap of the thermophotovoltaic cell is converted by the thermophotovoltaic cell into electric energy. The STPV system has a high theoretical conversion efficiency and makes efficient use of solar energy, thus having great application prospects in the commercial, civil and military fields.

The emitter plays a vital role in improving the efficiency of the STPV system, and a spectrally selective emitter can greatly improve the overall efficiency of the STPV system. The working temperature of the STPV system is very high (above 1000 K), raising a high requirement for the high-temperature stability of the emitter. Most of the existing spectrally selective emitters are structure-type spectrally selective emitters, and this type of emitters are susceptible to high-temperature degradation at high temperatures, such as structural breakdown, phase transformation of materials, and others.

Therefore, there is a need to develop a new material-type spectrally selective emitter and a design method thereof.

SUMMARY OF THE INVENTION

To solve the above technical problems, an object of the present invention is to provide a spectrally selective emitter and a design method thereof. The spectrally selective emitter of the present invention comprises hafnium oxide and erbium oxide, which is resistant to high-temperature oxidation and has selective emittance. The design method thereof is accurate and efficient, and can calculate the optical characteristics of the spectrally selective emitter based on the doping amount and particle size of erbium oxide nanoparticles.

To achieve the above object, the following technical solution is adopted in the present invention.

The first object of the present invention is to disclose a spectrally selective emitter having a one-dimensional layered structure, which comprises a first layer, a second layer and a third layer arranged in sequence, wherein the first layer and the third layer are both a hafnium oxide ($HfO_2$) layer, and the second layer is a hafnium oxide layer in which a plurality of erbium oxide ($Er_2O_3$) nanoparticles are distributed.

Compared with the traditional structure-type emitter, the spectrally selective emitter of the present invention is a material-type emitter that has a very high thermal stability, is resistant to high-temperature (1000-2500° C.) oxidation, and can fundamentally solve the problem of high-temperature degradation of structure-type emitters.

Because of the presence of two oxides, there will be no degradation such as high-temperature oxidation. The spectrally selective emitter of the present invention can retain the spectrally selective emittance and have extremely high thermal stability.

Preferably, the erbium oxide nanoparticles have a particle size of 5-30 nm.

Preferably, the spectrally selective emitter further comprises a substrate layer, made of molybdenum, tungsten, tantalum or silicon. The substrate layer is arranged on one side surface of the first layer or the third layer.

Preferably, the thickness of the first layer and the third layer is 50-200 nm, and the thickness of the second layer is 300-500 nm. The first layer and the third layer are mainly used to segregate the influence of the substrate and the environment on the second layer. That is, the thickness should not be too large as long as they can function for protection. The second layer is a doped layer, and needs to have a certain thickness to ensure the doping amount. The thickness is suitably not greater than 500 nm considering the cost and optical characteristics.

Preferably, the spectrally selective emitter has an absorption wavelength and/or a reflection wavelength in the range of 400-5000 nm.

The spectrally selective emitter of the present invention has selective emittance in the corresponding wavelength range. That is, it has a high emittance in the specified waveband, but a suppressed emittance in a useless waveband. The above properties of the spectrally selective emitter of the present invention are attributed to the following factors:

(1) $Er_2O_3$ nanoparticles have high emittance in a short-wave range, and by adjusting the doping amount of $Er_2O_3$ nanoparticles, the reflectance of the spectrally selective emitter can be adjusted.

(2) The spectrally selective emitter of the present invention has a layered structure, and such a composite layered structure has optical interference effect.

(3) The particle size of $Er_2O_3$ nanoparticles can change the optical characteristics of the film within a suitable range, and produce a desired emission spectrum.

A second object of the present invention is to disclose a design method of the spectrally selective thermal radiator, which is used to design the doping amount and particle size of erbium oxide nanoparticles in the second layer. The method comprises specifically the following steps:

1) obtaining the dielectric constants $\varepsilon_1$ and $\varepsilon_2$ of hafnium oxide and erbium oxide nanoparticles respectively, and determining the doping amount $f_v$ and radius r of the erbium oxide nanoparticles in the second layer;

2) obtaining the dielectric constant ee of the second layer according to the formula $$\varepsilon_e = \varepsilon_1\left(\frac{r^3 + 2\alpha_r f_v}{r^3 - \alpha_r f_v}\right);$$

3) obtaining the refractive index $n_e$ and extinction coefficient $k_e$ according to the formulas $$n_e = \left(\sqrt{\varepsilon_{e1}^2 + \varepsilon_{e2}^2} + \varepsilon_{e1}\right)^{1/2} / \sqrt{2}$$

and $$k_e = \left(\sqrt{\varepsilon_{e1}^2 + \varepsilon_{e2}^2} - \varepsilon_{e1}\right)^{1/2} / \sqrt{2}$$

respectively, where $\varepsilon_{e1}$ is the real part of the dielectric constant $\varepsilon_e$, and $\varepsilon_{e2}$ is the imaginary part of the dielectric constant $\varepsilon_e$;

4) calculating optical characteristics such as absorbance and/or reflectance of the spectrally selective emitter, to obtain a calculated value;

5) comparing the calculated absorbance and/or reflectance with a preset absorbance and/or reflectance, where if the calculated absorbance and/or reflectance is/are equal to the preset absorbance and/or reflectance, step 6) is directly performed; and if the calculated absorbance and/or reflectance is/are different from the preset absorbance and/or reflectance, the doping amount $f_v$ and the radius r of the erbium oxide nanoparticles in step 1) are modified, and steps 2)-4) are repeated, until the calculated absorbance and/or reflectance is/are equal to the preset absorbance and/or reflectance;

6) outputting a curve showing the relationship between the optical characteristics of the spectrally selective emitter and the doping amount $f_v$ of the erbium oxide nanoparticles in the second layer.

Preferably, in step 1), by using the refractive indices $n_1$ and $n_2$ of hafnium oxide and erbium oxide nanoparticles, the dielectric constants $\varepsilon_1$ and $\varepsilon_2$ of the two materials are calculated respectively.

Preferably, in step 1), $0 < f_v < 1$.

In the present invention, doping amount $f_v = V_2/(V_1+V_2)$, where $V_1$ is the volume of erbium oxide particles occupied in the doped layer, and $V_2$ is the volume of hafnium oxide particles occupied in the doped layer.

Preferably, in step 2), $$\alpha_r = \frac{3ic^3 x_r}{2\omega^3 \varepsilon_1^{\frac{3}{2}}},$$

where $$x_r = \frac{\sqrt{\varepsilon_2}\,\varphi(x_2)\varphi'(x_1) - \sqrt{\varepsilon_1}\,\varphi(x_1)\varphi'(x_2)}{\sqrt{\varepsilon_2}\,\varphi(x_2)\xi'(x_1) - \sqrt{\varepsilon_1}\,\xi(x_1)\varphi'(x_2)}, \quad x_1 = \omega r\sqrt{\varepsilon_1}/c,\ x_2 = \omega r\sqrt{\varepsilon_2}/c,$$

in which i represents an imaginary unit, $\omega$ represents an angular velocity, $\varphi_{(x)}$ represents $xj_1(x)$, $\zeta(x)$ represents $xh_1^{(1)}(x)$, $j_1(x)$ represents the first-order spherical Bessel function, $h_1^{(1)}(x)$ represents the Hankel function of the first kind, $\varphi'(x)$ represents the first derivative of $\varphi(x)$, $\xi'(x)$ represents the first derivative of $\xi(x)$, and $x = x1$ or $x2$.

Preferably, in step 4), the absorbance and/or reflectance of the spectrally selective emitter is/are calculated by the transfer matrix method. The spectral features of the emitter doped with particles are calculated by the transfer matrix method. The method is simple and easy to understand, has a wide scope of applications, and can improve the accuracy and efficiency of spectral characteristics design of the emitter and further reduce the research and development cost of the spectrally selective emitter, providing a basis for the design and development of new materials for emitters.

By means of the above design method, the optical characteristics of the spectrally selective emitter can be designed, such that the finally designed spectrally selective emitter has selective emittance in the corresponding wavelength range. The present invention fully discloses that the spectral emittance of material-type selective emitters of hafnium oxide doped with erbium oxide nanoparticles is a function of the doping amount and particle size of erbium oxide nanoparticles, thus providing an important basis for the preparation of material-type spectrally selective emitters.

By virtue of the above solutions, the present invention has the following advantages.

1. The material-type spectrally selective emitter designed in the present invention is formed of oxide materials, where the oxide materials have extremely high thermal stability, and are not susceptible to chemical reactions at high temperatures.

2. In the present invention, a computer-aided computing technology is used, to effectively overcome the cumbersome problems existing in design and manufacture.

The optimal doping amount and radius of particles are calculated by computer simulation, to greatly improve the design efficiency of the thermal radiator, and reduce the manufacturing cost.

3. The optical constant of hafnium oxide doped with erbium oxide nanoparticles is calculated by effective medium theory. The calculation method is accurate, scientific and efficient in the calculation of optoelectronic properties after particles are doped, by which the photoelectric constant of the material as a function of the doping amount and particle size of erbium oxide particles can be fully calculated.

The above description is only a summary of the technical solutions of the present invention. To make the technical means of the present invention clearer and implementable in accordance with the disclosure of the specification. The preferred embodiments of the present invention will be described in detail with reference to the accompanying drawings.

REFERENCE NUMERALS

Figure 1:
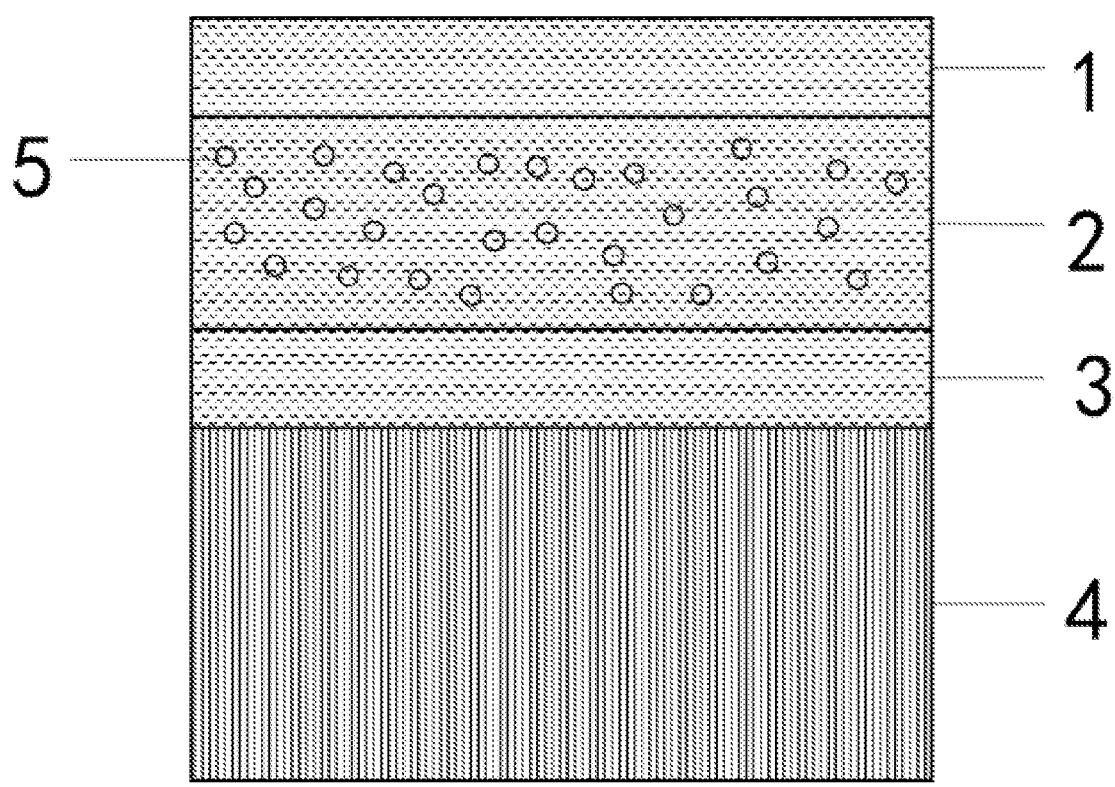
FIG. 1 is a schematic cross-sectional view showing the structure of a spectrally selective emitter in the present invention.

1—first layer; 2—second layer; 3—third layer; 4—substrate; 5—erbium oxide nanoparticles.

DETAILED DESCRIPTION OF THE PREFERRED EMBODIMENTS

In the description of the present invention, it should be noted that the terms "upper", "lower", "horizontal", "left", "right", "front", "rear", and others indicate directional or position relations based on the directional or position relations shown in the drawings, and are provided merely to facilitate and simplify the description of the present invention, instead of indicating or implying that the device or element referred to needs to have a specific orientation and be structured or operated in a specific orientation. Therefore, these terms cannot be understood as the restrictions to the present invention. Moreover, the terms "first", "second", "third" and "fourth" are for descriptive purposes only, and cannot be interpreted as indicating or implying relative importance.

In the description of the present invention, it should be noted that unless otherwise clearly specified and defined, the terms "connection" and "mounting" should be understood in a broad sense. For example, the connection may be fixed connection, detachable connection, or integral connection; may be mechanical connection, or electrical connection; may be direct connection, or indirect connection via an intermediate structure; or may be the internal connection of two elements. For those of ordinary skill in the art, specific meanings of the above terms in the present invention can be understood according to specific circumstances.

The specific embodiments of the present invention will be described in further detail with reference to embodiments. The following embodiments are intended to illustrate the present invention, instead of limiting the scope of the present invention.

Embodiment 1

As shown in FIG. 1, a material-type spectrally selective emitter is provided, which has a one-dimensional layered structure, and comprises a first layer 1, a second layer 2, a third layer 3, and a substrate 4 arranged sequentially from top to bottom. The first layer 1 and the third layer 3 are both a hafnium oxide layer, and the second layer 2 is a hafnium oxide layer in which a plurality of erbium oxide nanoparticles 5 are distributed. The thickness of the first layer 1 and the third layer 3 is 100 nm, and the thickness of the second layer 2 is 400 nm. The substrate 4 is a molybdenum substrate, having a size of 10 mm×10 mm×0.3 mm. The erbium oxide nanoparticles have a particle size r of 20 nm, and the doping amount in the second layer is $f_v$=0.1, 0.3 or 0.5.

The preparation method of the material-type spectrally selective thermal radiator of hafnium oxide doped with erbium oxide particles is radio-frequency magnetron sputtering, where $HfO_2$ and $Er_2O_3$ targets with a purity of 99.99% are used, the vacuum level in the sputtering chamber is 1×10⁻⁷ Torr, the flow rate of Ar is 4 mTorr, and the sputtering power is 150 W.

Embodiment 2

In the material-type spectrally selective emitter, the optical constants of the functional layer doped with nanoparticles are often difficult to determine, which is not conducive to the calculation of the overall optical characteristics of the subsequent thermal radiator. Therefore, the optical characteristics of the spectrally selective emitter doped with nanoparticles as a function of the doping amount and particle size of erbium oxide nanoparticles are calculated by the effective medium theory and the transfer matrix method. They can effectively reflect the change of the overall optical characteristics of the radiator, and predict the performance of the thermal radiator.

Figure 2:
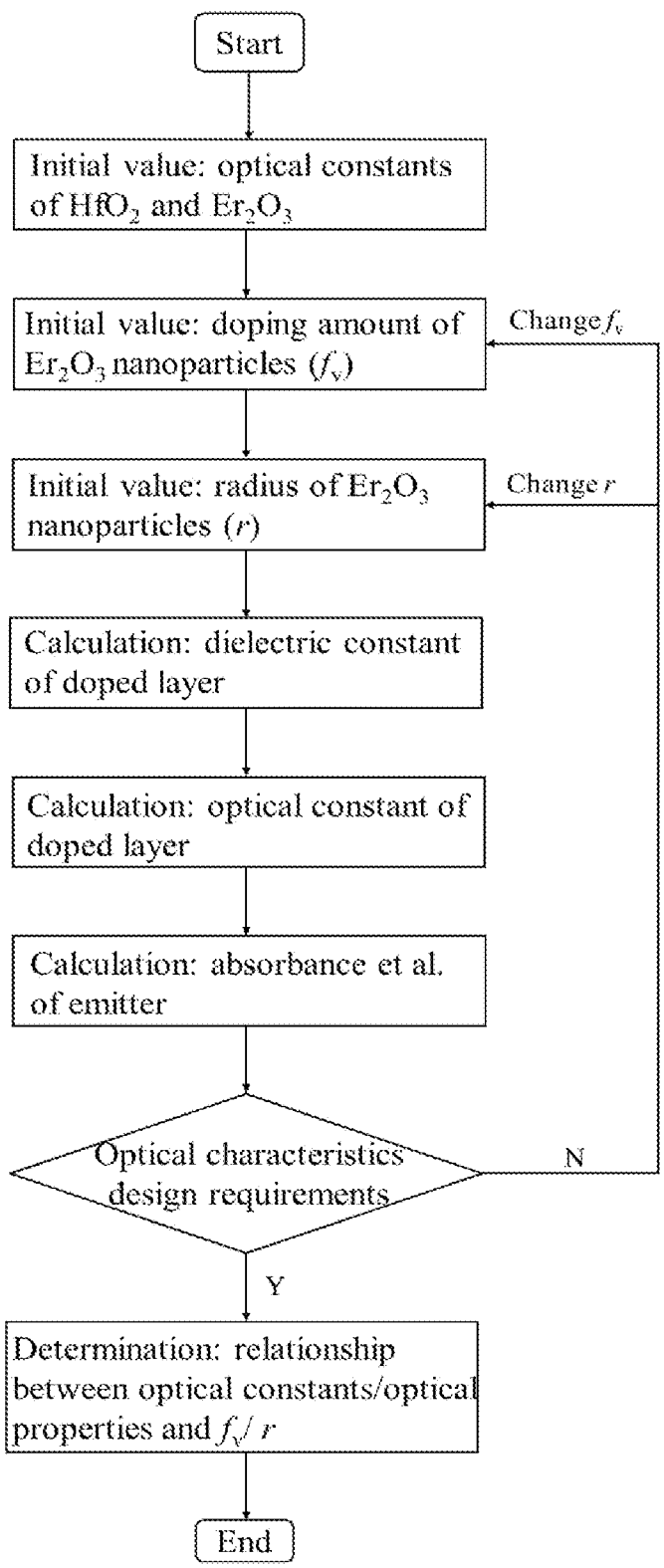
FIG. 2 is a flow chart showing the design of a spectrally selective emitter in the present invention.

Based on this, the present invention discloses a design method of the material-type spectrally selective thermal radiator in Embodiment 1. As shown in FIG. 2, the method comprises the following steps:

1) determining the refractive index $n_1$ of hafnium oxide ($HfO_2$) and the refractive index $n_2$ of erbium oxide nanoparticles ($Er_2O_3$), and calculating the dielectric coefficient $\varepsilon_1$ of $HfO_2$ and the dielectric coefficient $\varepsilon_2$ of $Er_2O_3$ nanoparticles;
2) determining the doping amount $f_v$ of $Er_2O_3$ nanoparticles;
3) determining the radius r of $Er_2O_3$ nanoparticles;
4) calculating the dielectric coefficient $\varepsilon_e$ of the second layer according to the formula $$\varepsilon_e = \varepsilon_1 \left( \frac{r^3 + 2\alpha_r f_v}{r^3 - \alpha_r f_v} \right),$$

where $$\alpha_r = \frac{3ic^3 x_r}{2\omega^3 \varepsilon_1^{\frac{3}{2}}},$$

where $$x_r = \frac{\sqrt{\varepsilon_2}\,\varphi(x_2)\varphi'(x_1) - \sqrt{\varepsilon_1}\,\varphi(x_1)\varphi'(x_2)}{\sqrt{\varepsilon_2}\,\varphi(x_2)\xi'(x_1) - \sqrt{\varepsilon_1}\,\xi(x_1)\varphi'(x_2)}, \quad x_1 = \omega r \sqrt{\varepsilon_1}/c,\ x_2 = \omega r \sqrt{\varepsilon_2}/c,$$

in which $\varphi(x)$ represents $xj_1(x)$, $\xi(x)$ represents $xh_1^{(1)}(x)$, $j_1(x)$ represents the first-order spherical Bessel function, $h_1^{(1)}(x)$ represents the Hankel function of the first kind, $\varphi'(x)$ represents the first derivative of $\varphi(x)$, $\xi'(x)$ represents the first derivative of $\xi(x)$, and $x=x_1$ or $x_2$;

5) calculating the refractive index $n_e$ and the extinction coefficient $k_e$ of the second layer according to the formulas $$n_e = \left( \sqrt{\varepsilon_{e1}^2 + \varepsilon_{e2}^2} + \varepsilon_{e1} \right)^{1/2} / \sqrt{2}$$

and $$k_e = \left( \sqrt{\varepsilon_{e1}^2 + \varepsilon_{e2}^2} - \varepsilon_{e1} \right)^{1/2} / \sqrt{2},$$

where $\varepsilon_{e1}$ is the real part of the dielectric constant $\varepsilon_e$, and $\varepsilon_{e2}$ is the imaginary part of the dielectric constant $\varepsilon_e$;

6) calculating optical characteristics such as absorptivity and reflectivity of the spectrally selective emitter;
7) determining whether the calculated optical characteristics such as absorbance and reflectance of the spectrally selective emitter meet the design requirements, where if not, the doping amount $f_v$ and the radius r of the doped particles in steps 2) and 3) are modified, and steps 4)-6) are repeated, until the results meet the design requirements; and
8) outputting a curve showing the relationship between the optical characteristics and the doping amount $f_v$.

Figure 3:
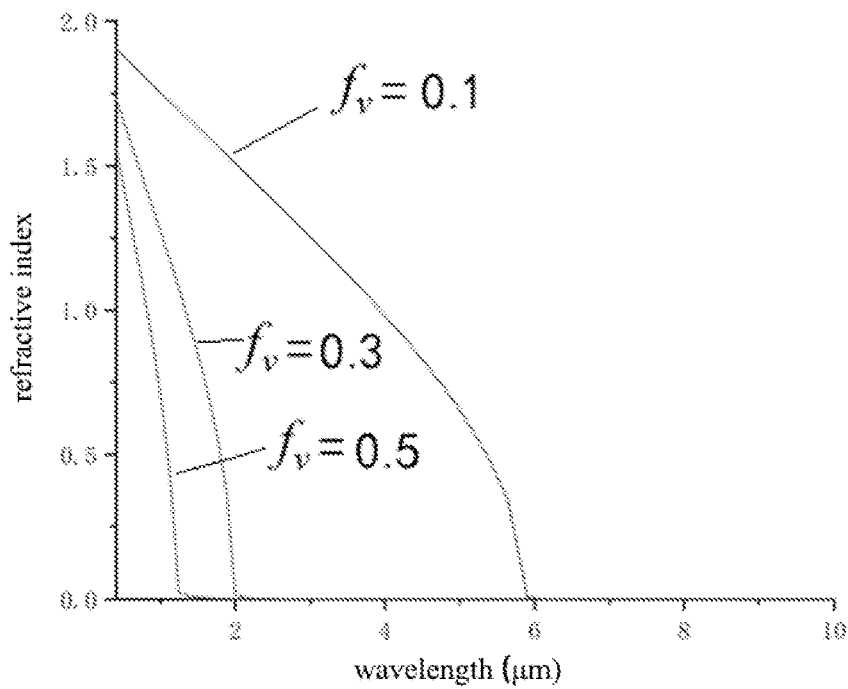
FIG. 3 is a graph showing the relationship between the doping amount of erbium oxide nanoparticles and the refractive index in the present invention.
Figure 4:
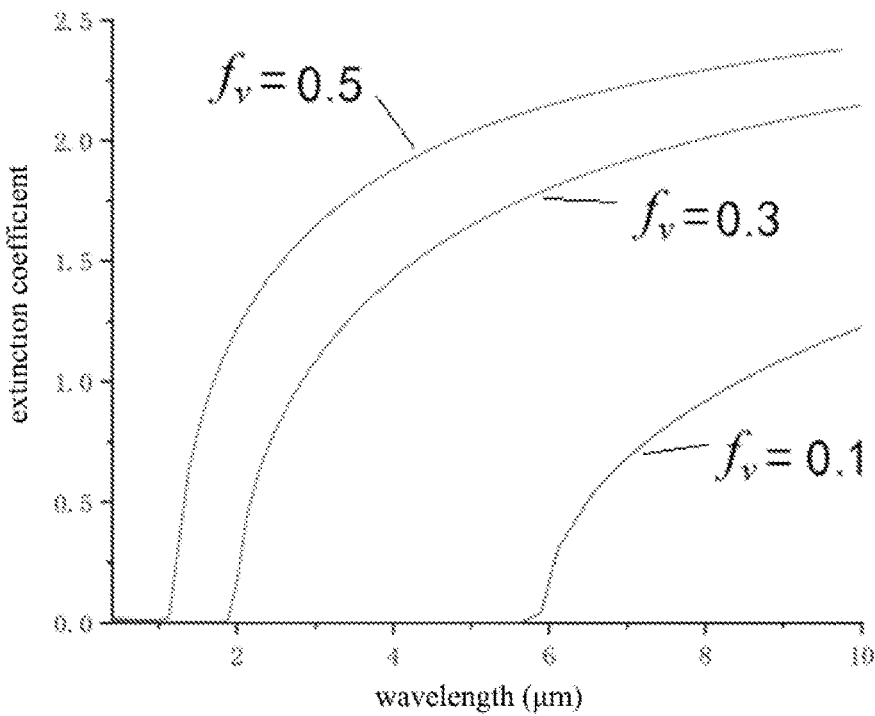
FIG. 4 is a graph showing the relationship between the doping amount of erbium oxide nanoparticles and the extinction coefficient in the present invention.
Figure 5:
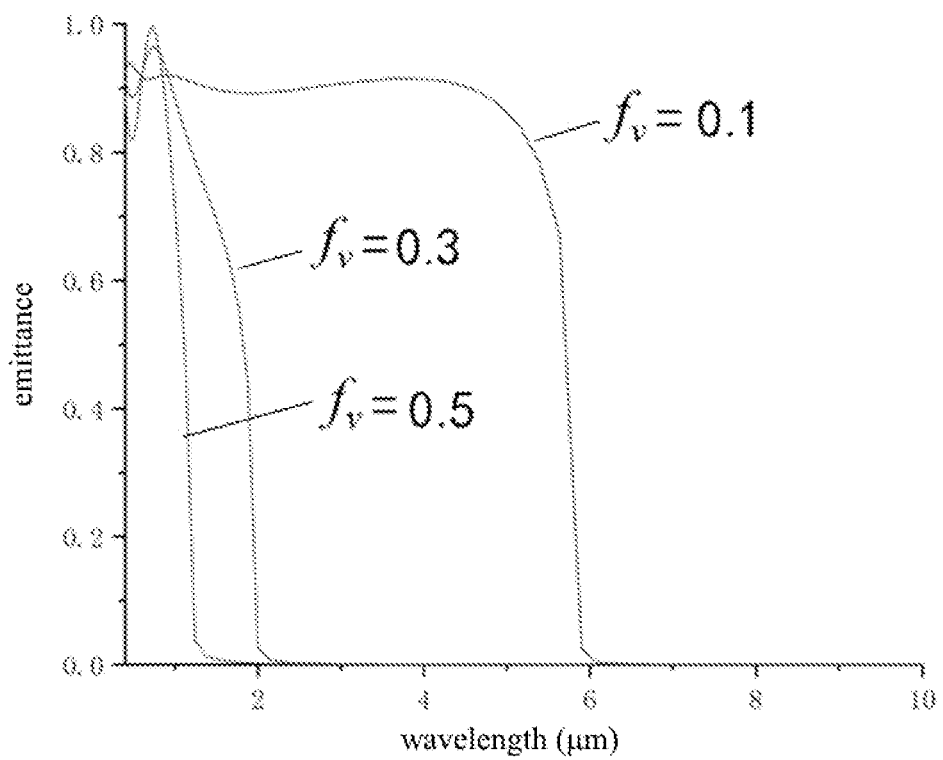
FIG. 5 is a graph showing the relationship between the doping amount of erbium oxide nanoparticles and the spectral performance in the present invention.

In a specific embodiment, the design method of the material-type spectrally selective emitter comprises the following steps:
1) selecting hafnium oxide (HfO$_2$) and erbium oxide (Er$_2$O$_3$) with a refractive index $n_1$ of 1.8-2.2, and $n_2$ of 1.78-1.83 respectively, and calculating the dielectric constants of the two materials, which are $\varepsilon_1$=3.24-4.84, and $\varepsilon_2$=3.17-3.35 respectively;
2) determining the doping amount $f_v$ of Er$_2$O$_3$, which is 0.1, 0.3 or 0.5;
3) determining the radius r of the doped Er$_2$O$_3$ particles, which is 20 nm;
4) calculating the dielectric coefficient $\varepsilon_e$ of the second layer according to the formula $$\varepsilon_e = \varepsilon_1 \left( \frac{r^3 + 2\alpha_r f_v}{r^3 - \alpha_r f_v} \right),$$

where $\alpha_r$ is calculated as described above;
5) calculating the refractive index $n_e$ and the extinction coefficient $k_e$ of the second layer according to the formulas $$n_e = \left( \sqrt{\varepsilon_{e1}^2 + \varepsilon_{e2}^2} + \varepsilon_{e1} \right)^{1/2} / \sqrt{2}$$

and $$k_e = \left( \sqrt{\varepsilon_{e1}^2 + \varepsilon_{e2}^2} + \varepsilon_{e1} \right)^{1/2} / \sqrt{2}$$

where $\varepsilon_{e1}$ is the real part of the dielectric constant $\varepsilon_e$, and $\varepsilon_{e2}$ is the imaginary part of the dielectric constant $\varepsilon_e$; and the calculated $n_e$ and $k_e$ are respectively as shown in FIGS. 3 and 4;
6) calculating optical characteristics such as absorbance and reflectance of the thermal radiator;
7) determining whether the calculated optical characteristics such as absorbance and reflectance of the emitter meet the design requirements, where if not, the doping amount $f_v$ and the radius r of the doped particles in steps 2) and 3) are modified, and steps 4)-6) are repeated, until the results meet the design requirements; and
8) outputting a curve showing the relationship between the optical characteristics and the doping amount $f_v$, as shown in FIG. 5.

While preferred embodiments of the present invention have been described above, the present invention is not limited thereto. It should be noted that some improvements and variations can be made by those skilled in the art without departing from the technical principles of the present invention, which are also contemplated in the protection scope of the present invention.

What is claimed is:

1. A spectrally selective emitter, comprising a first layer, a second layer and a third layer arranged in sequence, wherein the first layer and the third layer are both a hafnium oxide layer, and the second layer is a hafnium oxide layer in which a plurality of erbium oxide nanoparticles is distributed.

2. The spectrally selective emitter according to claim 1, wherein the erbium oxide nanoparticles have a particle size of 5-30 nm.

3. The spectrally selective emitter according to claim 1, further comprising a substrate layer, made of molybdenum, tungsten, tantalum or silicon.

4. The spectrally selective emitter according to claim 1, wherein the thickness of the first layer and the third layer is 50-100 nm, and the thickness of the second layer is 200-500 nm.

5. The spectrally selective emitter according to claim 1, wherein the spectrally selective thermal radiator has an absorption wavelength and/or a reflection wavelength in the range of 400-5000 nm.

6. A method for designing a spectrally selective emitter according to claim 1, comprising steps of:
1) obtaining the dielectric constants $\varepsilon_1$ and $\varepsilon_2$ of hafnium oxide and erbium oxide nanoparticles respectively, and determining the doping amount $f_v$ and radius r of the erbium oxide nanoparticles in the second layer;
2) obtaining the dielectric constant ee of the second layer according to the formula $$\varepsilon_e = \varepsilon_1 \left( \frac{r^3 + 2\alpha_r f_v}{r^3 - \alpha_r f_v} \right);$$

3) obtaining the refractive index $n_e$ and extinction coefficient $k_e$ of the second layer according to the formulas $$n_e = \left( \sqrt{\varepsilon_{e1}^2 + \varepsilon_{e2}^2} + \varepsilon_{e1} \right)^{1/2} / \sqrt{2}$$

and $$k_e = \left( \sqrt{\varepsilon_{e1}^2 + \varepsilon_{e2}^2} + \varepsilon_{e1} \right)^{1/2} / \sqrt{2},$$

wherein $\varepsilon_{e1}$ is the real part of the dielectric constant $\varepsilon_e$, and $\varepsilon_{e2}$ is the imaginary part of the dielectric constant $\varepsilon_e$;
4) calculating the absorbance and/or reflectance of the spectrally selective emitter, to obtain a calculated value;
5) comparing the calculated absorbance and/or reflectance with a preset absorbance and/or reflectance, wherein if the calculated absorbance and/or reflectance is/are equal to the preset absorbance and/or reflectance, step 6) is directly performed; and if the calculated absorbance and/or reflectance is/are different from the preset absorbance and/or reflectance, the doping amount $f_v$ and the radius r of the erbium oxide nanoparticles in step 1) are modified, and steps 2)-4) are repeated, until the calculated absorbance and/or reflectance is/are equal to the preset absorbance and/or reflectance;
6) outputting a curve showing the relationship between the optical characteristics of the spectrally selective emitter and the doping amount $f_v$ of the erbium oxide nanoparticles in the second layer.

7. The method according to claim 6, wherein in step 1), by using the refractive indices $n_1$ and $n_2$ of hafnium oxide and erbium oxide nanoparticles, the dielectric constants $\varepsilon_1$ and $\varepsilon_2$ of the two materials are calculated respectively.

8. The method according to claim 6, wherein in step 1), $0<f_v<1$.

9. The method according to claim 6, wherein in step 2), $$\alpha_r = \frac{3ic^3 x_r}{2\omega^3 \varepsilon_1^{\frac{3}{2}}},$$

wherein $$x_r = \frac{\sqrt{\varepsilon_2}\,\varphi(x_2)\varphi'(x_1) - \sqrt{\varepsilon_1}\,\varphi(x_1)\varphi'(x_2)}{\sqrt{\varepsilon_2}\,\varphi(x_2)\xi'(x_1) - \sqrt{\varepsilon_1}\,\xi(x_1)\varphi'(x_2)},\ x_1 = \omega r\sqrt{\varepsilon_1}/c,\ x_2 = \omega r\sqrt{\varepsilon_2}/c,$$

in which i represents the imaginary unit, $\omega$ represents the angular velocity, $\varphi(x)$ represents $xj_1(x)$, $\xi(x)$ represents $xh_1^{(1)}(x)$, $j_1(x)$ represents the first-order spherical Bessel function, $h_1^{(1)}(x)$ represents the Hankel function of the first kind, $\varphi'(x)$ represents the first derivative of $\varphi(x)$, $\xi'(x)$ represents the first derivative of $\xi(x)$, and $x=x_1$ or $x_2$.

10. The method according to claim 6, wherein in step 4), the absorbance and/or reflectance of the spectrally selective emitter is/are calculated by the transfer matrix method.

* * * * *